United States Patent [19]
Katva

[11] 3,756,557
[45] Sept. 4, 1973

[54] PUSH BUTTON VALVE

[75] Inventor: Kunto Ilmari Katva, Funen, Denmark

[73] Assignee: Broen Armatur A/S, Assens, Funen, Denmark

[22] Filed: Nov. 29, 1971

[21] Appl. No.: 202,916

[30] Foreign Application Priority Data
Nov. 30, 1972 Denmark..................6097/72

[52] U.S. Cl................ 251/45, 251/121, 251/263
[51] Int. Cl................................... F16k 31/385
[58] Field of Search............... 251/45, 46, 263, 251/121

[56] References Cited
UNITED STATES PATENTS
1,706,404   3/1929   Jacobson et al. ............ 251/45
3,055,630   9/1962   Becker.......................... 251/45

FOREIGN PATENTS OR APPLICATIONS
524,803   5/1956   Canada........................ 251/45

Primary Examiner—Arnold Rosenthal
Attorney—Watson, Cole, Grindle & Watson

[57] ABSTRACT

An off-on valve operated by a pivotable handle, the valve member of which consists of a main diaphragm and an auxiliary diaphragm wherein the movement of the central portion of the main diaphragm through the seat of the valve is prevented by a socket securing the auxiliary diaphragm to the main diaphragm, a compressible stem is arranged between the auxiliary diaphragm and the handle and is moved by means of a cam on the handle for manoeuvring the valve body, the handle being kept in two stable end positions by means of the reaction force of the stem acting upon the cam of the handle.

4 Claims, 2 Drawing Figures

PATENTED SEP 4 1973
3,756,557
FIG. 1
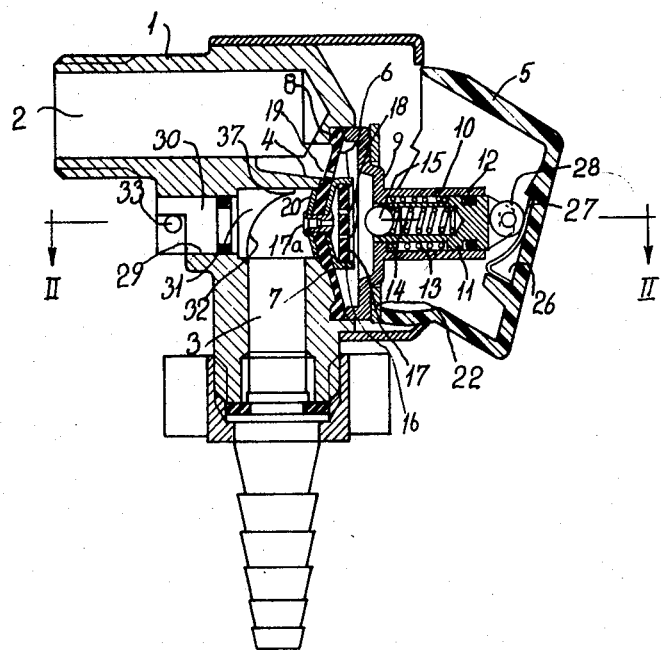
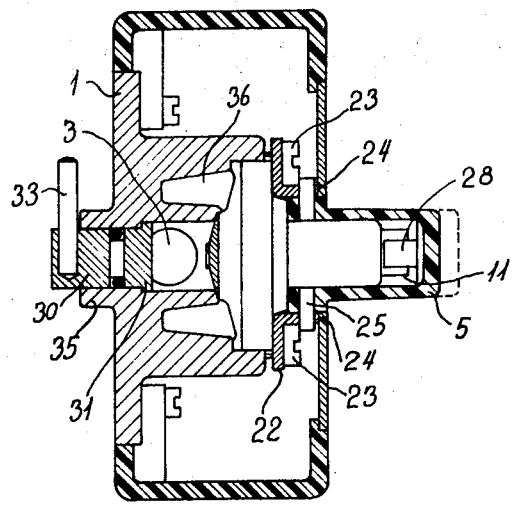
FIG. 2

PUSH BUTTON VALVE

BACKGROUND OF THE INVENTION

The present invention relates to a valve of the kind comprising a valve housing having an inlet duct and an outlet duct between which a valve seat is provided, a diaphragm for cooperation with the valve seat and a handle for moving the diaphragm against the valve seat, the handle being pivotally mounted about a pin and having a cam surface arranged excentrically with respect to the pin, a stem being slidably mounted in the valve housing between the diaphragm and the cam surface of the handle to move the diaphragm.

A valve of this type is known from U.S. Pat. No. 2,497,577.

It is the object of the present invention to provide a valve of the type referred to having two stable end positions, viz. an stable open position and a stable closed position without over-stretching the diaphragm.

SUMMARY OF THE INVENTION

According to the present invention this object is achieved by an auxiliary diaphragm mounted on the side of the main diaphragm facing the stem by means of a socket, the outer diameter of which is greater than the inner diameter of the valve seat and in that the stem is hollow and contains a spring and a pressure member slidably in the stem and protruding therefrom for cooperation with the main diaphragm via the auxiliary diaphragm. By means of this construction it is achieved that the socket by means of which the auxiliary diaphragm is mounted will prevent the main diaphragm from being over-stretched when the handle is pivoted from one stable end position to another stable end position for closing the valve.

In order to be able to adjust the valve in such a way that the flow rate of the medium through the valve in the open position thereof does not exceed an appropriate value an adjustable throttle member may be provided in the inlet duct or the outlet duct.

If the throttle member is arranged in the outlet duct the throttle member may consist of a rotatable cylinder, the end surface of which is formed as a part of a cylindrical surface extending into a knee formed by means of the outlet duct.

The main diaphragm may be provided with at least one hole positioned in the portion of the main diaphragm which in the closed position of the main diaphragm is positioned within the valve seat and the auxiliary diaphragm may have a hole which is offset with respect to the hole in the main diaphragm.

BRIEF DESCRIPTION OF THE DRAWINGS

FIG. 1 illustrates an axial section through a valve according to the invention, and FIG. 2 a section along the line II—II in FIG. 1.

DESCRIPTION OF THE PREFERRED EMBODIMENT

The valve illustrated consists of a valve housing 1 having an inlet duct 2 and an outlet duct 3. Between the two ducts a valve seat 4 is provided which cooperates with a valve body 6 which is operated by means of a handle 5. The valve body comprises a main diaphragm 7 the peripheral margin of which is secured in a recess 8 by means of a shallow cup 9 having a depressed bottom. The back side of the cup supports a cylindrical guide 10 for a stem comprising a head 11 in the form of a piston which is sealed with respect to the cylinder 10 by means of a sealing ring 12. Between the head of the stem and the inner end of the guide 10 a pressure spring 13 is provided and within the hollow stem a further pressure spring 14 is arranged which biases a ball 15 in the direction towards the valve seat 4. To the surface of the main diaphragm 7 facing the stem an auxiliary diaphragm 17 is secured by means of a socket 16. The socket 16 is secured to the main diaphragm by means of a hollow rivet 17a which in the position of the diaphragm 7 shown in FIG. 1 allows communication between the two sides of the diaphragm 7. Two holes 18 are provided in the auxiliary diaphragm 17 offset with respect to the hole through the hollow rivet 17a. The outer diameter of the socket 16 is greater than the inner diameter of the valve seat 4. The rivet 17a also secures a plate 20 at the front surface of the main diaphragm.

In the main diaphragm 7 a further hole 19 is provided outside the area opposite the valve seat 4 for communication between the inlet duct 2 of the valve and the space in the valve housing above the main diaphragm 7.

The cup 9 is secured by means of a ring 22 which by means of two screws 23, cf. FIG. 2, is secured in the valve housing 1. The ring 22 has two ears 24 which serve as supports for two pivots 25 about which the handle 5 is pivotally mounted. In FIG. 1, the common axis for the two pivots 25 is indicated by means of a cross to the right of the ball 15.

A recess 26 is provided at the inner surface of the handle 5 and a spring 27 is arranged in the recess. The outer surface of the spring 26 forms a cam surface for a roll 28 which is pivotally mounted at the end of the head 11 projecting from the guide 10. The cam surface is eccentrically arranged with respect to the axis of the pivots 25 and has a curvature such that in one end position of the handle illustrated in FIG. 1 the head 11 is moved as far as possible to the right by means of the spring 13, and accordingly also the ball 15 is moved as far as possible to the right in such a way that the valve member may open. If the handle 5 is pivoted counterclockwise from the position illustrated in FIG. 1, the cam surface of the spring 27 will press the roll 28 and accordingly also the ball 15 inwardly. By this movement the ball 15 will press the auxiliary diaphragm 17 against the rivet 17a and close the hole of the rivet and move the main diaphragm towards the seat 4. When the main diaphragm contacts the seat 4 the socket 16 will press the diaphragm firmly against the seat and will prevent further movement of the central portion of the main diaphragm through the seat. The curvature of the spring 27 is designed in such a manner that the head 11 of the stem during continued movement of the handle 5 counterclockwise will be pressed to the left in FIG. 1. During this part of the closing movement of the handle 5, a movement of the central portion of the main diaphragm to the left is prevented by means of socket 16 as explained above. Accordingly, the ball 15 will be pressed into the hollow stem against the action of the spring 14 until the handle 5 reaches a position, the dead-center position, wherein the head 11 has been moved as far as possible to the left in FIG. 1 and wherein the highest portion of the spring 27 contacts the roll 28. By continued movement in the counterclockwise direction, the highest portion of the spring 27 will pass the roll 28 which accordingly will be moved a small distance to the right by means of the spring 13 until further movement of the handle is stopped by abutment between a top end of the handle and the valve housing 1. During the last part of this movement the ball 15 will be moved a small distance to the left in FIG. 1 by means of the spring 14. The valve is now in the closed position which is stable due to the fact that the highest portion of the spring 27 has passed the roll 28.

During the shutting off of the flow area through the valve seat 4 the pressure prevailing in the inlet duct 2 will be transmitted through the hole 19 to the right side of the main diaphragm in FIG. 1 and support the closing movement of the main diaphragm by pressing it against the valve seat 4. Accordingly, the main diaphragm will not close immediately and accordingly water hammering is avoided in case the valve is fitted into a water supply system.

The valve is opened by pivoting the handle 5 to the position thereof illustrated in FIG. 1. FIG. 1 shows the valve in the position which the parts thereof occupy immediately after the handle 5 has been pivoted to the opening position. The spring 13 has moved the head 11 as far as possible to the right with respect to the guide 10 and has released the ball 15 from contact with the auxiliary diaphragm 17. Due to the holes 18 in the auxiliary diaphragm the same pressure prevails at both sides there-of, and accordingly the auxiliary diaphragm can immediately due to the resiliency thereof occupy the position illustrated in FIG. 1 in which the auxiliary diaphragm has uncovered the hole through the hollow rivet 17a. The pressure prevailing at the right side of the main diaphragm will now be released through the holes 18 and the hole through the hollow rivet 17a and accordingly, the inlet pressure prevailing at the left side of the main diaphragm along the portion thereof positioned outside the valve seat 4 will now lift the main diaphragm. Medium may now flow through the seat 4 which is partly surrounded by a horse-shoe-formed duct 36, cf- FIG. 2, the upper portion of which is in communication with the inlet duct 2.

Coaxially with the main diaphragm 7 and the auxiliary diaphragm 17 a cylindrical recess 29 is provided in the valve housing 1 in which cylindrical shank of a throttle member 31 is provided. The surface 32 of the throttle member 31 facing the main diaphragm is formed as a quarter of a cylinder and the shank 30 is sealed in the recess by means of a sealing ring. The throttle member may be rotated by means of a pin 33 which may be moved at the back side of the valve housing. A shoulder between the shank 30 and the throttle member 31 cooperates with a corresponding shoulder in the valve housing in order to prevent withdrawal of the throttle member 31. Moreover, a movement of the throttle member 31 further inwards into the outlet duct 3 is prevented by abutment of the pin 33 against a collar 35 at the back side of the valve.

By turning the pin 33 it is possible to pre-adjust the flow area through the valve. By turning the pin 33 also the cylindrical surface 32 will be turned, and will accordingly throttle the outlet duct 3 more or less. However, a complete shutting off of the outlet duct 3 can never occur due to the fact that the distance between the shoulder of the throttle member 31 and the top edge 37 thereof is less than the width of the outlet duct 3.

The valve illustrated is mainly intended to be used as a wash stand tap because the pressure in the inlet duct 2 usually will be almost constant, and accordingly it is possible by preadjusting the flow area of the valve to achieve an appropriate flow rate through the valve in the open position. Due to the fact that the adjustment of the flow area must be made by means of the pin 33 at the back side of the valve housing it is not immediately possible for the user to amend the adjustment once made, and accordingly the valve is suitable to be used in hospitals and the like institutions in which a limitation of the water consumption is important or it is important to be able to maneuver the valve quickly without the flow rate being too high.

I claim:

1. Valve comprising a valve housing having an inlet duct and an outlet duct between which a valve seat is provided, a resilient main diaphragm on said valve seat, the periphery of said main diaphragm being secured in a recess surrounding said valve seat and located a distance in front thereof, an auxiliary resilient diaphragm, the peripheral edge of said auxiliary diaphragm being secured to said main diaphragm at the side of said main diaphragm facing away from said valve seat by means of a socket element arranged coaxially with said valve seat and having an outer diameter greater than the inner diameter of said valve seat, an opening being provided in said main diaphragm inside the periphery of said auxiliary diaphragm and at least one opening being provided in said auxiliary diaphragm offset with respect to said opening in said main diaphragm, said main diaphragm being provided with at least one further opening arranged outside said valve seat and in communication with said inlet duct, guide means in said housing for slidably guiding a longitudinally movable stem, one end of said stem facing said auxiliary diaphragm and the other end of said stem facing said auxiliary diaphragm and the other end of said stem cooperating with a cam surface provided inside a pivotally arranged handle, said cam surface being arranged eccentrically with respect to the pivot axes of said handle, and the highest portion of said cam surface being movable beyond said outer end of said stem.

2. Valve according to claim 1 further comprising an adjustable throttle member provided in one of said inlet and outlet ducts.

3. Valve according to claim 2, wherein said throttle member comprises a cylinder, an end surface of which is formed as a part of a cylinder surface and projects into a knee formed by the outlet duct.

4. Valve according to claim 1 wherein said guide means comprises a cylindrical guide for axially guiding said stem with respect to said valve seat, a spring positioned between said bottom of the cylindrical guide and the stem, said stem having a roll for cooperation with the cam surface at one end and a ball at the other end, the ball being biased by means of a spring for cooperation with the main diaphragm via the auxiliary diaphragm.

* * * * *